United States Patent Office 3,023,207
Patented Feb. 27, 1962

3,023,207
POLYALKYLENEGLYCOL 3,4-DIHYDRO-2H-1,3-BENZOXAZIN-3-YLALKYL MONOETHERS
Raymond H. Rigterink, Midland, Mich., assignor to The Dow Chemical Company, Midland, Mich., a corporation of Delaware
No Drawing. Filed Oct. 22, 1959, Ser. No. 847,886
5 Claims. (Cl. 260—244)

This invention is directed to polyalkyleneglycol 3,4-dihydro-2H-1,3-benzoxazin-3-ylalkyl monoethers corresponding to the formula

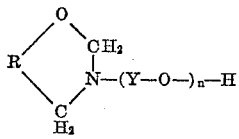

wherein R represents an ortho-arylene radical of the benzene series, each Y represents an ethylene or propylene radical and $n$ is an integer from 6 to 40, inclusive. The expression "ortho-arylene radical of the benzene series" is employed in the present specification and claims to refer to the divalent arylene radicals of the benzene series whose valencies are on adjacent carbon atoms in the benzene ring and includes ortho phenylene radicals substituted by one or more substituents such as phenyl, alkyl containing 1 to 16 carbon atoms, chlorine, bromine, benzyl, and cyclohexyl.

The new compounds of this invention are viscous liquids somewhat soluble in water and in many organic solvents such as ethanol, acetone, and carbon tetrachloride. The compounds are useful as parasiticides, and adapted to be employed as active constituents of compositions for the control of Mexican Bean Bettle and Southern Army Worms. The compounds are also useful as herbicides. The new compounds may be prepared by causing a polyalkyleneglycol aminoalkylmonoether having the formula $$H_2N-(Y-O-)_n-H$$

to react with formaldehyde or a formaldehyde yielding substance, to form an intermediate formaldehyde-polyalkylene glycol aminoalkyl monoether condensation product. The intermediate is thereafter reacted with a phenolic compound corresponding to the formula

R—O—H such as phenol, 4-chlorophenol, 4-bromophenol, 4-methylphenol, 2,4-dichlorophenol, 2,4,5-trichlorophenol, 2,4,5-tribromophenol, 4-chloro-2-methylphenol, o-isobutylphenol 4-bromo-2-methylphenol, 4-tertiarybutylphenol, 2,4-ditertiarybutylphenol, 2-methylphenol, 4-hexylphenol, 4-cyclohexylphenol, 4-benzylphenol, 4-butyl-2-methylphenol, 4-decylphenol, 2,4,5-trimethylphenol, 4-nonylphenol, or 4-phenylphenol to produce the desired product and water of reaction.

In carrying out the first step of this method, the polyalkylene glycol aminoalkyl monoether is intimately contacted with formaldehyde or a formaldehyde yielding substance in an inert reaction medium such as methanol, ehtanol, or dioxane. The contacting of the reactants is carried out with stirring and at a temperature of from 0° to 80° C. Good results are obtained by reacting one molecular proportion of the monoether reactant with two molecular proportions of formaldehyde. The formaldehyde may be employed in any readily available form such as formalin or paraformaldehyde. The amount of formaldehyde employed is calculated upon the basis of the monomer unit. The reaction conveniently may be carried out in the presence of a small amount of alkali metal hydroxide as catalyst.

In carrying out the second step of the method, the phenolic compound or a solution thereof in inert solvent is added portionwise to the reaction mixture prepared as described above. In such operations, one molecular proportion of phenolic compound is employed with each molecular proportion of the monoether reactant used in preparation of the intermediate condensation product. The reaction takes place smoothly within the temperature range of from 30° C. to 100° C. with the production of the desired product and water of reaction. Upon completion of the reaction, the reaction mixture may be fractionally distilled under reduced pressure to remove the low boiling constituents including solvent and water of reaction, and obtain the desired product as a viscous liquid residue.

In an alternative method of preparing the new compounds, a 3-loweralkanol-3,4-dihydro-2H-1,3-benzoxazine corresponding to the following formula:

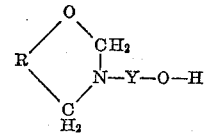

is reacted with ethylene oxide or propylene oxide, or a mixture thereof, or successively with each of ethylene oxide and propylene oxide to introduce a polyoxyalkylene chain containing at least 5 oxyalkylene units for the hydroxyl hydrogen in the 3-loweralkanol-3,4-dihydro-2H-1,3-benzoxazine reactant. The number of oxyalkylene units introduced into the molecule is somewhat dependent upon the condition under which the reactants are brought together, and primarily dependent upon the molar ratio of employed benzoxazine reactant and alkylene oxide. Thus one molecular proportion of the benzoxazine reactant is reacted with ethylene oxide or propylene oxide or a mixture thereof, in the amount of from about 5 to 39 molecular proportions of total alkylene oxide depending upon whether it is desired to introduce from 5 to 39 alkylene oxide units into the molecule. The reaction is carried out in the presence of a catalyst which may be an alkali metal hydroxide, such as sodium hydroxide, and takes place readily at a temperature of from 100° to 210° C. and under a pressure of from 10 to 500 pounds per square inch. Upon completion of the reaction, the reaction mixture may be fractionally distilled under reduced pressure to remove any low boiling constituents and obtain the desired product as a viscous liquid residue.

The following examples illustrate the invention but are not to be considered as limiting.

EXAMPLE 1

*Pentaethyleneglycol-6-Chloro-3,4-Dihydro-2H-1,3-Benzoxazin-3-ylethyl Monoether*

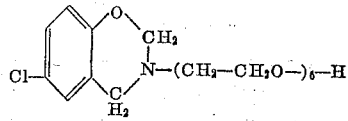

Pentaethyleneglycol 2-aminoethyl monoether having an index of refraction $n/D$ of 1.4798 at 25% C. (65.3 grams; 0.23 mole) was added portionwise with stirring over a period of 15 minutes to a solution of 15 grams (0.5 mole) of paraformaldehyde and 0.25 gram potassium hydroxide in 100 milliliters of methanol. The reaction vessel was continuously cooled during the addition to maintain the temperature in the range of 25°–30° C. Upon completion of the addition, 37.5 grams (0.25 mole) 4-chlorophenol was added in a single portion to the reaction mixture and the resulting mixture heated with stirring under reflux for two hours at a temperature of approximately 75° C. The reaction mixture was thereafter fractionally distilled under reduced pressure at gradually increasing temperatures up to a pot temperature of 100° C. at 10 millimeters pressure to remove low-boiling constituents and obtain a pentaethyleneglycol 6-chloro-3,4-dihydro-2H-1,3-benzoxazin-3-ylethyl monoether product as a liquid residue. This product had a refractive index $n/D$ of 1.5196 at 25° C.

EXAMPLE 2

*Pentaethyleneglycol-5,6,8-Trichloro-3,4-Dihydro-2H-1,3-Benzoxazin-3-ylethyl Monoether*

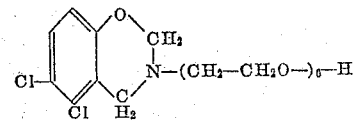

Pentaethyleneglycol 2-aminoethyl monoether (108.6 grams; 0.385 mole) was added portionwise with stirring over a period of five minutes to a solution of 30 grams (1.0 mole) paraformaldehyde and 0.5 gram of potassium hydroxide in 250 milliliters of methanol. The reaction vessel was continuously cooled during the addition to maintain the temperature in the range of from 25° to 30° C. Thereupon, 98.7 grams (0.5 mole) 2,4,5-trichlorophenol was added with stirring and the solution heated at the boiling temperature with stirring and under reflux for two hours. The reaction mixture was thereafter concentrated by fractional distillation under reduced pressure at gradually increasing temperatures of up to a pot temperature of 110° C. at 5 millimeters pressure, to remove low boiling constituents and obtain a pentaethyleneglycol 5,6,8-trichloro-3,4-dihydro-2H-1,3-benzoxazin-3-ylethyl monoether product as a liquid residue. This product had a refractive index $n/D$ of 1.5466 at 25° C. and was soluble in carbon tetrachloride and only slightly soluble in water.

EXAMPLE 3

*Polyethyleneglycol 6-Chloro-3,4-Dihydro-2H-1,3-Benzoxazin-3-ylethyl Monoether*

6 - chloro - 3,4-dihydro-2H-1,3-benzoxazine-3-ethanol, having a refractive index $n/D$ of 1.5830 at 25° C. (42.7 grams; 0.2 mole), 88.0 grams (2 moles) of ethylene oxide and 0.5 gram of potassium hydroxide were placed in a reaction vessel which was thereafter closed and sealed. The reaction vessel and contents were agitated and heated under autogenous pressure to a temperature of 130° C. at a pressure of 150 pounds per square inch, and thereafter maintained at a temperature of 130°–165° C. for one hour. As a result of these operations, there was obtained a polyethyleneglycol 6-chloro-3,4-dihydro-2H-1,3-benzoxazin-3-ylethyl monoether product as a viscous liquid residue. This product had an index of refraction $n/D$ of 1.5063 at 25° C. and an average oxyethylene content of about 11 oxyethylene units per molecule.

EXAMPLE 4

*Polyethyleneglycol 6,8-Dichloro-3,4-Dihydro-2H-1-3-Benzoxazin-3-ylethyl Monoether*

6,8 - dichloro-3,4-dihydro-2H-1,3-benzoxazine-3-ethanol having a refractive index $n/D$ of 1.5905 at 25° C. (49.6 grams; 0.2 mole), 79.2 grams (1.8 moles) of ethylene oxide, and 0.5 gram of sodium hydroxide were placed in a reaction vessel which was thereafter closed and sealed. The reaction vessel and contents were agitated and heated under autogeneous pressure to a temperature of 126° C. and a pressure of 300 pounds per square inch and thereafter maintained at a temperature of 126°–138° C. for an hour. As a result of these operations, there was obtained a polyethyleneglycol 6,8-dichloro-3,4-dihydro-2H-1,3-benzoxazin-3-ylethyl monoether product as a viscous, liquid residue. The product was slightly soluble in water and had an index of refraction $n/D$ of 1.5111 at 25° C. and an average oxyethylene content of about 10 oxyethylene units per molecule.

EXAMPLE 5

6 - chloro-3,4-dihydro-8-methyl-2H-1,3-benzoxazine-3-ethanol having a refractive index $n/D$ of 1.5693 at 25° C. (45.5 grams; 0.2 mole), 79.2 grams (1.8 moles) of ethylene oxide and 0.5 gram of sodium hydroxide were placed in a reaction vessel which was thereafter closed and sealed. The reaction vessel and contents were agitated and heated under autogenous pressure to a temperature of 120° C. and a pressure of 350 pounds per square inch and thereafter maintained at a temperature of 120° C.–170° C. for twenty minutes. As a result of these operations, there was obtained a polyethylene glycol-6-chloro-3,4-dihydro-8-methyl-2H-1,3-benzoxazin-3-ylethyl monoether product as a viscous liquid having a refractive index $n/D$ of 1.5069 at 25° C., and an average oxyethylene content of about 10 oxyethylene units per molecule.

EXAMPLE 6

6 - chloro - 3,4-dihydro-2H-1,3-benzoxazine-3-ethanol (21.4 grams; 0.1 mole), 40.6 grams (0.7 mole) of propylene oxide, and 0.5 gram of potassium hydroxide were placed in a reaction vessel which was thereafter closed and sealed. The reaction vessel and contents were agitated and heated under autogenous pressure to a temperature of 125° C. and a pressure of 140 pounds per square inch and thereafter maintained at a temperature of 125°–140° C. for 1.5 hours. Thereafter heating was discontinued and the vessel and contents chilled. The reaction vessel was then opened and to its contents were added 30.8 grams (0.7 mole) of ethylene oxide, and the vessel thereafter closed, sealed and heated with agitation and under autogenous pressure at the temperature range of from 125°–156° C. for a half hour. As a result of these operations, there was obtained a polyalkyleneglycol 6-chloro - 3,4-dihydro-2H-1,3-benzoxazin-3-ylethyl monoether product as a very viscous liquid having an average oxyalkylene content of 7 oxypropylene units and 8 oxyethylene units per molecule. The product had a refractive index $n/D$ of 1.4905 at 25° C. and was soluble in carbontetrachloride.

EXAMPLE 7

6 - chloro - 3,4-dihydro-2H-1,3-benzoxazine-3-ethanol (42.8 grams; 0.2 mole), 116.2 grams (2.0 mole) of propylene oxide, and 0.5 gram of caustic soda were placed in a reaction vessel which was thereafter closed and sealed. The contents of the reaction vessel were agitated and heated under autogenous pressure to a temperature of 150° C. for an hour and a pressure of 245 pounds per square inch and thereafter maintained at a temperature of 150° C. As a result of these operations, there was obtained a polypropyleneglycol 6-chloro-3,4-dihydro-2H-1,3-benzoxazin-3-ylethyl monoether product having an index of refraction $n/D$ of 1.4713 at 25° C., and an average oxypropylene content of about 10 oxypropylene units per molecule. The product was a viscous liquid of moderate solubility in water.

EXAMPLE 8

6 - chloro - 3,4-dihydro-2H-1,3-benzoxazine-3-ethanol (21.4 grams; 0.1 mole), 83.6 grams (1.9 moles) of ethylene oxide, and 0.5 gram of sodium hydroxide were placed in a reaction vessel which was thereafter closed and sealed. The reaction vessel and contents were agitated and heated under autogenous pressure to a temperature of 140° C. and a pressure of 400 pounds per square inch and thereafter maintained at a temperature of 140°–160° C. for 1.5 hours. As a result of these operations, there was obtained a polyethyleneglycol 6-chloro-3,4-dihydro-2H-1,3-benzoxazin-3-ylethyl monoether product having an average oxyethylene content of about 20 oxyethylene units per molecule. The product was a water soluble, viscous liquid having a refractive index n/D of 1.4858 at 25° C.

EXAMPLE 9

6 - chloro - 3,4 - dihydro-2H-1,3-benzoxazine-3-ethanol (10.7 grams; 0.05 mole), 85.8 grams (1.95 moles) of ethylene oxide, and 0.5 gram of sodium hydroxide were placed a pressure reaction vessel which was thereafter closed and sealed. The reaction vessel and contents were agitated and heated under autogenous pressure to a temperature of 120° and a pressure of 290 pounds per square inch, and thereafter maintained at a temperature of 120°–182° C. for 15 minutes. As a result of these operations, there was obtained a polyethyleneglycol 6-chloro - 3,4 - dihydro-2H-1,3-benzoxazin-3-ylethyl monoether product as a water soluble, viscous liquid having an average oxyethylene content of about 40 oxyethylene units per molecule.

EXAMPLE 10

Pentaethyleneglycol 2-aminoethyl monoether (65.3 grams; 0.23 mole) was reacted with 15 grams (0.5 mole) of paraformaldehyde and 0.25 gram potassium hydroxide in 100 milliliters of methanol to produce an intermediate product which was thereafter reacted with 37.5 grams (0.25 mole) paratertiarybutylphenol. The conditions of reaction and methods of separation were exactly the same as those described in Example 1. As a result of these operations, there was obtained a pentaethyleneglycol 6-tertiarybutyl-3,4-dihydro - 2H - 1,3 - benzoxazin-3-ylethyl monoether product as a viscous liquid. This product had a refractive index n/D of 1.5107 at 25° C., and was soluble in acetone and ethanol.

EXAMPLE 11

3,4-dihydro-2H-1,3-benzoxazine-3-ethanol (35.8 grams; 0.2 mole), 79.2 grams (1.8 moles) of ethylene oxide and 0.5 gram of sodium hydroxide were reacted together substantially as described in Example 5. As a result of these operations, there was obtained a polyethyleneglycol 3,4-dihydro-2H-1,3-benzoxazin-3-ylethyl monoether product as a viscous liquid having an index of refraction n/D of 1.5079 at 25° C. and an average oxyethylene content of about 10 oxyethylene units per molecule.

EXAMPLE 12

Ethylene oxide (79.2 grams; 1.8 moles), 38.6 grams (0.2 mole) of 3,4-dihydro-6-methyl-2H-1,3-benzoxazine-3-ethanol and 0.5 gram of sodium hydroxide were reacted together in substantially the manner as described in Example 5. As a result of these operations, there was obtained a polyethyleneglycol 3,4-dihydro-6-methyl-2H-1,3-benzoxazin-3-ylethyl monoether product as a water soluble, viscous liquid having a refractive index n/D of 1.5041 at 25° C. and an average oxyethylene content of about 10 oxyethylene units per molecule.

EXAMPLE 13

Ethylene oxide (79.2 grams; 1.8 moles), 58.3 grams (0.2 mole) of 3,4-dihydro-6-(1,1,3,3-tetramethylbutyl)-2H-1,3-benzoxazine-3-ethanol and 0.5 gram sodium hydroxide were reacted together as described in Example 5. As a result of these operations, there was obtained a polyethyleneglycol 3,4-dihydro - 6 - (1,1,3,3 - tetramethylbutyl)-2H-1,3-benzoxazin-3-ylethyl monoether product as a viscous liquid having an index of refraction n/D of 1.5000 and an average oxyethylene content of about 10 oxyethylene units per molecule.

EXAMPLE 14

Ethylene oxide (79.2 grams; 1.8 moles), 69.4 grams (0.2 mole) of 6-dodecyl-3,4-dihydro-2H-1,3-benzoxazine-3-ethanol, and 0.5 gram of potassium hydroxide were reacted together substantially as described in Example 6. As a result of these operations, there was obtained a polyethyleneglycol 6 - dodecyl-3,4-dihydro-2H-1,3-benzoxazin-3-ylethyl monoether product as a viscous liquid having an index of refraction n/D of 1.4989 and an average oxyethylene content of about 10 oxyethylene units per molecule.

EXAMPLE 15

Ethylene oxide (79.2 grams; 1.8 moles), 51 grams (0.2 mole) of 3,4-dihydro-6-phenyl-1,3-benzoxazine-3-ethanol were reacted together substantially as described in Example 5. As a result of these operations, there was obtained a polyethyleneglycol 3,4-dihydro-6-phenyl-2H-1,3-benzoxazin-3-ylethyl monoether product as a water soluble, viscous liquid having a refractive index n/D of 1.5330 at 25° C. and an average oxyethylene content of about 10 oxyethylene units per molecule.

EXAMPLE 16

Ethylene oxide (79.2 grams; 1.8 mole), 52.3 grams (0.2 mole) of 6-cyclohexyl-3,4-dihydro-2H-1,3-benzoxazine-3-ethanol and 0.5 gram of sodium hydroxide were reacted together in the manner as described in Example 5. As a result of these operations, there was obtained a polyethyleneglycol 6 - cyclohexyl-3,4-dihydro-2H-1,3-benzoxazin-3-ylethyl monoether product as a water soluble, viscous liquid having a refractive index n/D of 1.5089 at 25° C. and an average oxyethylene content of about 10 oxyethylene units per molecule.

In a similar manner, other polyalkyleneglycol 3,4-dihydro-2H-1,3-benzoxazin-3-ylalkyl monoether compounds may be prepared of which the following are representative.

A polypropyleneglycol 6-bromo - 3,4 - dihydro-2H-1,3-benzoxazin-3-ylethyl monoether product containing an average oxypropylene content of about 12 oxypropylene units per molecule by reacting one mole of 6-bromo-3,4-dihydro-2H-1,3-benzoxazine - 3 - ethanol with about 11 moles of propylene oxide.

A polyethyleneglycol 6,8-dibromo-3,4-dihydro-2H-1,3-benzoxazin-3-ylethyl monoether product containing an average oxyethylene content of about 20 oxyethylene units per molecule by reacting one mole of 6,8-dibromo-3,4-dihydro-2H-1,3-benzoxazine-3-ethanol with 19 moles of ethylene oxide.

A polyethylene glycol 6-bromo-3,4-dihydro-8-methyl-2H-1,3-benzoxazin-3-ylethyl monoether product containing an average oxyethylene content of about 16 oxyethylene units per molecule by reacting one mole of 6-bromo-3,4 - dihydro-8-methyl-2H-1,3-benzoxazine-3-ethanol with 15 moles of ethylene oxide.

A polyalkyleneglycol 6 - bromo - 3,4 - dihydro-2H-1,3-benzoxazin-3-ylethyl monoether product containing an average oxyalkylene content of about 7 oxypropylene and 8 oxyethylene units per molecule by reacting one mole of 6-bromo-3,4-dihydro-2H-1,3-benzoxazine-3-ethanol and successively with 7 moles each of propylene oxide and ethylene oxide.

A polyethyleneglycol 6-bromo - 3,4 - dihydro-2H-1,3-benzoxazin-3-ylethyl monoether product containing an average oxyethylene content of about 40 oxyethylene units per molecule by reacting one mole of 6-bromo-3,4-dihydro-2H-1,3-benzoxazin-3-ethanol with 39 moles of ethylene oxide;

An octapropylene glycol 6-benzyl-3,4-dihydro-2H-1,3-benzoxazin-3-ylisopropyl monoether by reacting together propylene glycol 2-aminopropyl monoether, paraformaldehyde, and 4-benzylphenol;

A polyalkyleneglycol 6 - tertiarybutyl-3,4-dihydro-2H-1,3-benzoxazin-3-ylisopropyl monoether product containing an average oxyalkylene content of 4 oxyethylene units and 4-oxypropylene units per molecule by reacting together paraformaldehyde, 4-tertiarybutylphenol, and a polyalkyleneglycol 2-aminoalkyl monoether containing average oxyalkylene content of 4 oxyethylene units and 4 oxypropylene units per molecule;

A polypropylene glycol 6-hexadecyl-3,4-dihydro-2H-1,3-benzoxazin-3-yl-β-methylethyl monoether containing an average oxypropylene content of about 20 oxypropylene units per molecule by reacting one mole of 6-hexadecyl-3,4-dihydro-2H-1,3-benzoxazine-3-β-methylethanol with 19 moles of propylene oxide;

A polyalkyleneglycol 5,6-dichloro-8-bromo-3,4-dihydro-2H-1,3-benzoxazin-3-ylethyl monoether containing an average oxyalkylene content of about 3 oxypropylene and 4 oxyethylene units per molecule by reacting one mole of 5,6-dichloro-8-bromo-3,4-dihydro-2H-1,3-benzoxazine-3-ethanol with a mixture containing 3 moles of each of ethylene oxide and propylene oxide.

The preferred compounds of this invention are those corresponding to the formula

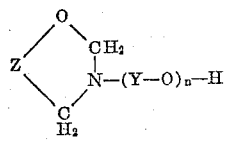

in which Z represents

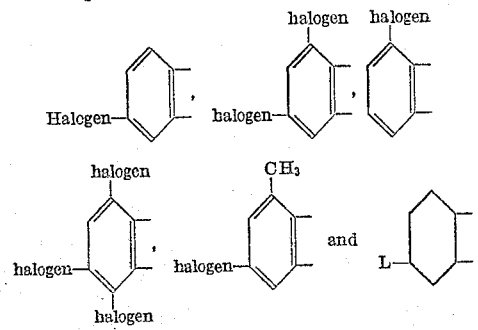

wherein L represents an alkyl radical containing from 1 to 16 carbon atoms, benzyl, phenyl, or cyclohexyl. The new polyalkyleneglycol 3,4-dihydro-2H-1,3-benzoxazin-3-ylalkyl monoethers of this invention are useful as parasiticides and herbicides. For such use the compounds may be dispersed on inert finely divided solids and employed as dusts. Also, such mixtures may be dispersed in water with the aid of a wetting agent, and the resulting aqueous suspensions used as sprays. In other procedures, the compounds may be employed in oil or other liquid solvent and the resulting composition employed directly, or as a component of oil-in-water or water-in-oil emulsions to obtain preparations to be used as a spray or wash. In a representative operation a seedbed planted with the seeds of canary gras was saturated with an aqueous composition comprising as sole toxicant 100 parts by weight of the pentaethyleneglycol 6-tertiarybutyl-3,4-dihydro-2H-1,3-benzoxazin-3-ylethyl monoether per million parts of ultimate mixture. This treatment resulted in a 93 percent control of the growth of the germinant seeds and emerging seedlings of the canary grass.

The polyalkyleneglycol aminoalkyl monoethers employed as starting materials in accordance with the teachings of the present invention may be prepared by known procedures. In one such procedure, ethylene oxide or propylene oxide is caused to react with an alkylene chlorohydrin such as ethylene chlorohydrin 2-chloropropanol or 2-chloroisopropanol in the presence of an aluminum oxide catalyst to yield an intermediate polyalkyleneglycol chlorohydrin product. This intermediate is thereafter caused to react with ammonia to obtain the desired polyalkyleneglycol aminoalkyl monoether product. In the first step of the method, the average number of oxyalkylene units introduced into the molecule is somewhat dependent upon the conditions under which the reactants are brought together, and primarily dependent upon the molar ratio of employed alkylene chlorohydrin reactant and alkylene oxide. Thus one molecular proportion of the chlorohydrin reactant is caused to react with ethylene oxide or propylene oxide, or a mixture thereof, or successively with each of ethylene oxide or propylene oxide in the ratio of from about 1 to about 38 molecular proportions of total alkylene oxide, depending upon whether it is desired to introduce from 1–38 alkylene oxide units in the molecule. The reaction between alkylene oxide and chlorohydrin takes place smoothly at a temperature of about 100° C. under atmospheric pressure.

In the second step of the method, the intermediate polyalkyleneglycol chlorohydrin is caused to react with a molecular excess of liquid ammonia or ammonium hydroxide. The reaction takes place smoothly at about 100° C. and under an autogenous pressure of from about 50 to about 500 pounds per square inch. Upon completion of the reaction the resulting reaction mixture may be concentrated by distillation under reduced pressure to remove low boiling constituents and obtain the desired starting material as a liquid residue.

The 3,4-dihydro-2H-1,3-benzoxazine-3-loweralkanol starting materials as employed herein may be prepared by causing two molecular proportions of formaldehyde, which may be in the form of a formaldehyde-yielding substance such as paraformaldehyde, to react with one molecular proportion of ethanolamine 2-aminopropanol, or 2-aminoisopropanol to produce an intermediate formaldehyde condensation product. These products are thereafter reacted with a suitable phenolic of the sort described to obtain the desired starting material. The condition of reaction and methods of separation are all as previously described for the type reaction.

The instant specification and claims are a continuation in part of application Serial Number 700,544, filed December 4, 1957, now abandoned.

I claim:

1. A compound corresponding to the formula

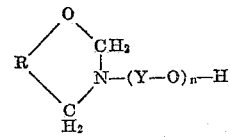

wherein each Y represents an alkylene radical containing from 2 to 3 carbon atoms, inclusive, and having its two valencies on adjacent carbon atoms, $n$ represents an integer from 6 to 40, inclusive, and R represents a member of the group consisting of o-phenylene and substituted o-phenylene in which the substituents are selected from the group consisting of chlorine, bromine, phenyl, benzyl, cyclohexyl, and alkyl containing from 1 to 16 carbon atoms.

2. The polyalkyleneglycol 6-chloro-3,4-dihydro-2H-1,3-benzoxazin-3-ylalkyl monoether corresponding to the formula

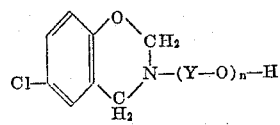

wherein each Y represents an alkylene radical containing from 2 to 3 carbon atoms inclusive, and having its two valencies on adjacent carbon atoms, and $n$ represents an integer from 6 to 40 inclusive.

3. The polyalkyleneglycol 5,6,8-trichloro-3,4-dihydro-2H-1,3-benzoxazin-3-ylalkyl monoether corresponding to the formula

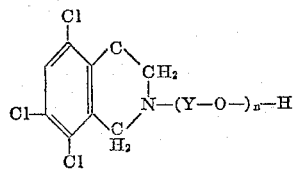

wherein each Y represents an alkylene radical containing from 2 to 3 carbon atoms, inclusive, and having its two valencies on adjacent carbon atoms, and $n$ represents an integer from 6 to 40, inclusive.

4. The polyalkyleneglycol 6,8-dichloro-3,4-dihydro-2H-1,3-benzoxazin-3-ylalkyl monoether corresponding to the formula

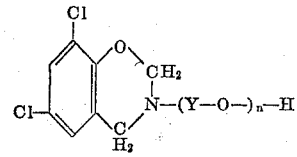

wherein each Y represents an alkylene radical containing from 2 to 3 carbon atoms, inclusive, and having its two valencies on adjacent carbon atoms, and $n$ represents an integer from 6 to 40, inclusive.

5. The polyalkyleneglycol 6-chloro-8-methyl-3,4-dihydro-2H-1,3-benzoxazin-3-ylalkyl monoether corresponding to the formula

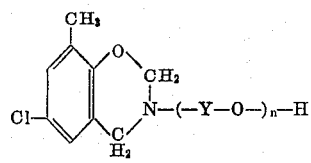

wherein each Y represents an alkylene radical containing from 2 to 3 carbon atoms, inclusive, and having its two valencies on adjacent carbon atoms, and $n$ represents an integer from 6 to 40, inclusive.

References Cited in the file of this patent

UNITED STATES PATENTS 2,571,985    Carnes ------------------ Oct. 16, 1951

UNITED STATES PATENT OFFICE
CERTIFICATE OF CORRECTION

Patent No. 3,023,207            February 27, 1962

Raymond H. Rigterink

It is hereby certified that error appears in the above numbered patent requiring correction and that the said Letters Patent should read as corrected below.

Column 3, lines 14 to 19, the formula should appear as shown below instead of as in the patent:

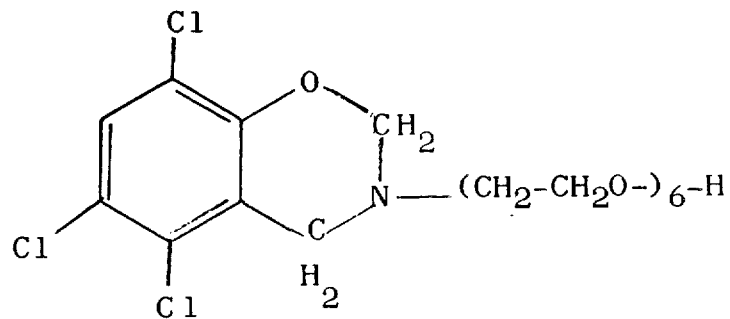

Signed and sealed this 24th day of July 1962.

(SEAL)
Attest:

ERNEST W. SWIDER            DAVID L. LADD

Attesting Officer            Commissioner of Patents